E. F. McGOWEN.
Baling-Press.

No. 214,167. Patented April 8, 1879.

WITNESSES:
Chas. Nida.
C. Sedgwick.

INVENTOR:
E. F. McGowen
BY Munn & Co
ATTORNEYS.

UNITED STATES PATENT OFFICE.

EDMOND F. McGOWEN, OF HOUSTON, TEXAS.

IMPROVEMENT IN BALING-PRESSES.

Specification forming part of Letters Patent No. 214,167, dated April 8, 1879; application filed January 30, 1879.

*To all whom it may concern:*

Be it known that I, EDMOND F. McGOWEN, of Houston, in the county of Harris and State of Texas, have invented a new and useful Improvement in Baling-Presses, of which the following is a specification.

My invention relates to presses for baling cotton and other materials, of the class in which the material is placed in a press-box, and then compressed by a screw-follower, operated by horse or other power.

The invention consists in certain novel features of construction, whereby the work may be done with greater facility than heretofore.

In my press the bale is compressed, the movement of the follower arrested, and the screw reversed to withdraw the follower without stopping or changing the motion of the driving-shaft, as more particularly set forth hereinafter, and shown in the accompanying drawings, wherein—

Figure 1:
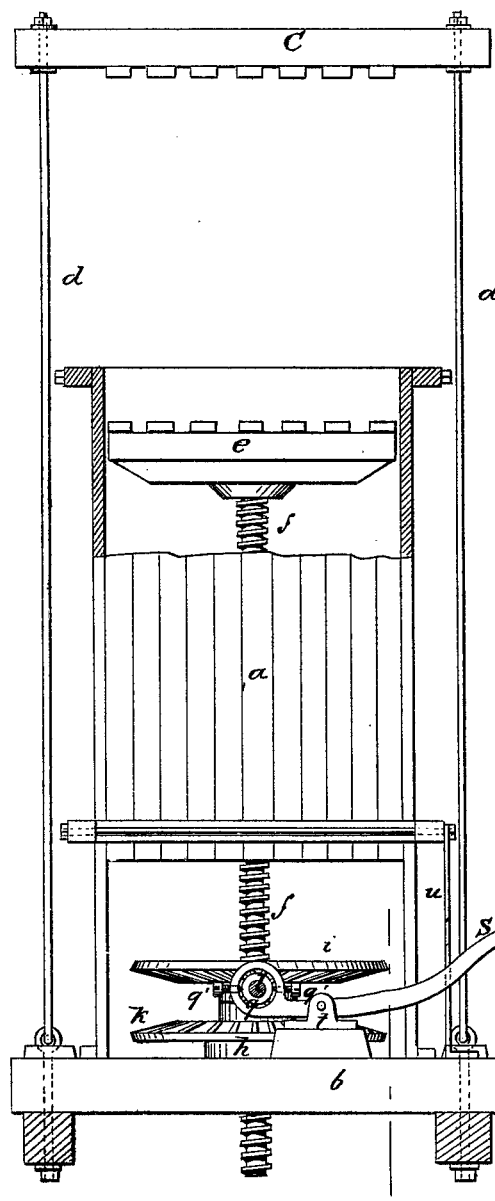
Figure 3:
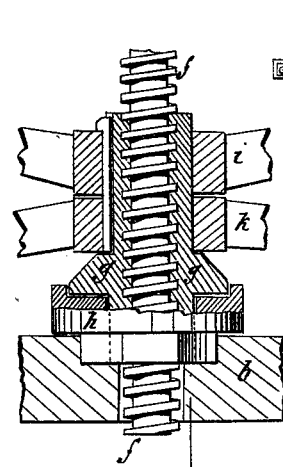
Figure 2:
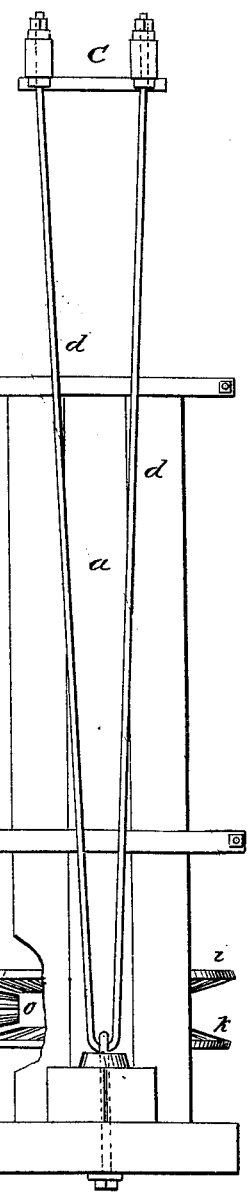

Figure 1 is an elevation, partially in section, of my improved press. Fig. 2 is an elevation at right angles to Fig. 1. Fig. 3 is a detail view.

Similar letters of reference indicate corresponding parts.

$a$ is the press-box, resting on sills $b$ $b$. C is the upper platen of the press, secured on rods $d$, that are hung to sills $b$ by eyebolts, so that the platen C may be swung to one side to give room for placing the material in box $a$. The rods $d$ may be connected in any desired manner to sills $b$, and detachable if required.

The follower $e$ is attached at the upper end of a screw, $f$, that passes through a nut, $g$, at the base of the press, the nut having a flange, which rests on collar $h$, that is secured to sills $b$. (See Fig. 3.)

Upon nut $g$, secured by a key or otherwise, are two bevel-gear wheels, $i$ $k$, a short distance apart, and with the teeth of one wheel facing those of the other.

The driving-shaft $l$ carries a pulley, $n$, at its outer end, for connection to suitable power, and upon its inner end, between the gears $i$ $k$, is keyed a beveled pinion, $o$. Shaft $l$ is supported in boxes $p$ $q$.

The outer box, $p$, is pivoted by set-screws $p'$ in a bearing, $r$, that is bolted to the base of the press, and inner box, $q$, is pivoted by screws $q'$ in a bearing-ring that is formed or secured upon the shorter end of a lever, S, the fulcrum of which is in lugs $t$ on the base of the press.

This construction permits the inner end of shaft $l$ vertical movement by the operation of lever S, to throw pinion $o$ in gear with either wheel $i$ $k$; or it may be held intermediately and out of gear, the space between wheels $i$ $k$ being sufficient for that purpose.

The press will be operated as follows: The follower $e$, being at the bottom of box $a$, the box filled with cotton, and the platen C in place above box $a$, the lever S will then be moved up or down, according to the direction in which shaft $l$ is driven, to bring pinion $o$ in gear with wheel $i$ or $k$, and thereby raise follower $e$ by the action of screw $f$.

I have shown a notched bar, $u$, into which lever S may be caught to retain the pinion in position.

When the bale is sufficiently compressed, lever S is then to be shifted to bring pinion $o$ to the intermediate point. Screw $f$ will then remain stationary while the bale is bound and removed, after which pinion $o$ is to be moved in contact with wheel $i$ or $k$, to reverse the screw and draw the follower to the bottom of the box. These movements can be all accomplished without checking or stopping shaft $l$.

Instead of swinging in the bearing $r$, as described, the driving-shaft may be fitted so that it can be raised and lowered bodily by a lever or screw. When constructed for raising at the inner end, as described, the teeth of pinion $o$ will be suitably beveled for meshing with the gear-wheels with driving-shaft inclined.

I do not limit myself in these particulars, as they may be varied without departing from my invention.

Having thus described my invention, I claim as new and desire to secure by Letters Patent—

The collar $h$, secured on follower-screw and to the sill $b$, and the nut $g$, having a flange that rests on said collar, in combination with the bevel-gear wheels $i$ $k$ $o$, the latter adjustable with respect to the other two, and operated by the shaft $l$, as and for the purpose specified.

EDMOND FELDER McGOWEN.

Witnesses:
CHAS. MILLER,
CHAS. SCORIGGA.